(12) United States Patent
Brown et al.

(10) Patent No.: US 12,554,072 B2
(45) Date of Patent: Feb. 17, 2026

(54) FOUR-PORT HORIZONTAL MINIATURE DUPLEX CONNECTOR ADAPTER

(71) Applicant: Leviton Manufacturing Co., Inc., Melville, NY (US)

(72) Inventors: Amelia Ann Brown, Lake Forest Park, WA (US); Jon Riley, Redmond, WA (US)

(73) Assignee: LEVITON MANUFACTURING CO., INC., Melville, NY (US)

( * ) Notice: Subject to any disclaimer, the term of this patent is extended or adjusted under 35 U.S.C. 154(b) by 418 days.

(21) Appl. No.: 18/324,557

(22) Filed: May 26, 2023

(65) Prior Publication Data

US 2024/0393545 A1 Nov. 28, 2024

(51) Int. Cl.
G02B 6/36 (2006.01)
G02B 6/38 (2006.01)

(52) U.S. Cl.
CPC ................. *G02B 6/3825* (2013.01)

(58) Field of Classification Search
CPC ............... G02B 6/3825; G02B 6/3897; G02B 6/44528; G02B 6/36
See application file for complete search history.

(56) References Cited

U.S. PATENT DOCUMENTS

| | | |
|---|---|---|
| 4,283,150 A | 8/1981 | Hanazono et al. |
| 4,528,728 A | 7/1985 | Schmidt et al. |
| 4,659,119 A | 4/1987 | Reimert |
| 4,692,809 A | 9/1987 | Beining et al. |
| 4,944,568 A | 7/1990 | Danbach et al. |
| 5,004,866 A | 4/1991 | Cooke et al. |
| 5,282,259 A | 1/1994 | Grois et al. |
| 5,312,263 A | 5/1994 | Zapalski et al. |
| 5,325,454 A | 6/1994 | Rittle et al. |
| 5,713,752 A | 2/1998 | Leong et al. |
| 5,781,366 A | 7/1998 | Matsuoka |
| 5,883,995 A | 3/1999 | Lu |
| 6,108,482 A | 8/2000 | Roth |
| 6,352,375 B1 | 3/2002 | Shimoji et al. |

(Continued)

FOREIGN PATENT DOCUMENTS

| | | |
|---|---|---|
| CA | 2 880 810 C | 12/2019 |
| CA | 3 060 164 A1 | 4/2022 |

(Continued)

OTHER PUBLICATIONS

International Search Report and Written Opinion received for PCT Application Serial No. PCT/US2024/029030 dated Aug. 5, 2024, 11 pages.

(Continued)

*Primary Examiner* — Jennifer Doan
(74) *Attorney, Agent, or Firm* — Amin, Turocy & Watson, LLP

(57) ABSTRACT

A miniature duplex connector (MDC) adapter is designed accommodate four MDC ports while maintaining a footprint or cross-sectional profile that is similar to that of an LC quad adapter, thereby allowing the MDC adapter to be used in fiber cassettes or other fiber enclosures that are designed to use LC quad adapters. The adapter's MDC ports are oriented horizontally and arranged in a 2×2 array. The adapter design can be expanded to accommodate larger numbers of ports using a similar port arrangement.

20 Claims, 8 Drawing Sheets

(56) References Cited

U.S. PATENT DOCUMENTS

| | | |
|---|---|---|
| 6,375,363 B1 | 4/2002 | Harrison et al. |
| 6,485,322 B1 | 11/2002 | Branch et al. |
| 6,595,696 B1 | 7/2003 | Zellak |
| 6,607,308 B2 | 8/2003 | Dair et al. |
| 6,626,697 B1 | 9/2003 | Martin et al. |
| 6,688,780 B2 | 2/2004 | Duran |
| 6,796,715 B2 | 9/2004 | Chiu et al. |
| 7,153,041 B2 | 12/2006 | Mine et al. |
| 7,198,409 B2 | 4/2007 | Smith et al. |
| 7,298,946 B2 | 11/2007 | Mueller |
| 7,347,633 B2 | 3/2008 | Minota |
| 7,473,131 B2 | 1/2009 | Dunwoody et al. |
| 7,689,089 B2 | 3/2010 | Wagner et al. |
| 7,841,779 B1 | 11/2010 | Bianchini et al. |
| 8,147,272 B2 | 4/2012 | Rhein |
| 8,186,890 B2 | 5/2012 | Lu |
| 8,337,243 B2 | 12/2012 | Elkhatib et al. |
| 8,740,478 B2 | 6/2014 | Weberpals |
| 8,781,284 B2 | 7/2014 | Bragg |
| 8,821,031 B2 | 9/2014 | Lin et al. |
| 8,944,697 B2 * | 2/2015 | Youngkin ............ G02B 6/3869 385/71 |
| 8,958,680 B2 | 2/2015 | Bragg |
| 9,077,126 B2 | 7/2015 | Bragg |
| 9,236,691 B2 | 1/2016 | Bragg |
| 9,453,963 B2 | 9/2016 | Sato |
| 9,494,746 B2 | 11/2016 | Sanders et al. |
| 9,632,256 B2 | 4/2017 | Yang et al. |
| 10,502,903 B1 | 12/2019 | Wang et al. |
| 11,579,379 B2 * | 2/2023 | Chang .................... G02B 6/406 |
| 2002/0131122 A1 | 9/2002 | Anderl et al. |
| 2005/0208822 A1 | 9/2005 | Ishigami et al. |
| 2006/0103140 A1 | 5/2006 | Bella et al. |
| 2009/0138637 A1 | 5/2009 | Hargreaves et al. |
| 2010/0054665 A1 | 3/2010 | Jones et al. |
| 2010/0054668 A1 | 3/2010 | Nelson et al. |
| 2011/0177710 A1 | 7/2011 | Tobey et al. |
| 2012/0321266 A1 | 12/2012 | Lin et al. |
| 2013/0272671 A1 | 10/2013 | Jones et al. |
| 2013/0315539 A1 | 11/2013 | Koreeda et al. |
| 2015/0078710 A1 | 3/2015 | Sato |
| 2017/0097485 A1 | 4/2017 | Yang et al. |
| 2020/0310048 A1 * | 10/2020 | Chang .................... G02B 6/406 |
| 2021/0055495 A1 | 2/2021 | Brewster et al. |
| 2021/0263247 A1 | 8/2021 | Bechtolsheim et al. |
| 2022/0146773 A1 | 5/2022 | Bell et al. |
| 2022/0260800 A1 | 8/2022 | Baelen et al. |

FOREIGN PATENT DOCUMENTS

| | | |
|---|---|---|
| EP | 2 848 970 A2 | 3/2015 |
| EP | 3 850 410 A1 | 7/2021 |
| JP | 2008-225133 A | 9/2008 |
| WO | 2014/021901 A1 | 2/2014 |
| WO | 2018/017883 A1 | 1/2018 |
| WO | 2020/055536 A1 | 3/2020 |

OTHER PUBLICATIONS

"SN SC Duplex Quad Channel (8 fiber) Adapter, without flange, Blue", L-Com an Infinite Brand, FOA-SN74-11, Url—https://www.l-com.com/sn-sc-duplex-quad-channel-8-fiber-adapter-flange-blue-foa-sn74-11, Retrieved from the internet on Oct. 28, 2024, 5 pages.

"SN SC Duplex Quad Channel (8 fiber) Adapter, without flange, Blue", L-Com an Infinite Brand, FOA-SN74-01, Url—https://www.l-com.com/sn-sc-duplex-quad-channel-8-fiber-adapter-without-flange-blue-foa-sn74-01, Retrieved from the internet on Oct. 28, 2024, 5 pages.

International Search Report and Written Opinion received for PCT Application Serial No. PCT/US2012/049554 dated Feb. 26, 2013, 6 pages.

* cited by examiner

FOUR-PORT HORIZONTAL MINIATURE DUPLEX CONNECTOR ADAPTER

TECHNICAL FIELD

The disclosed subject matter relates generally to fiber optic adapters.

BACKGROUND

Many fiber optic systems employ miniature duplex connector (MDC) connectors for termination and connectivity of fiber optic cables. The small form factor of these MDC connectors allows a large number of fiber optic cables to be connected in high density arrays, such as those found in fiber optic patch panels used in data centers. MDC connectors typically house two optical fibers, each of which is terminated on a respective ferrule that protrudes from the front of the connector, thereby providing termination and connectivity for a transmit fiber and a receive fiber.

SUMMARY

The following presents a simplified summary of the disclosed subject matter in order to provide a basic understanding of some aspects of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

Various embodiments described herein relate to an MDC adapter that can accommodate four MDC ports while maintaining a footprint or cross-sectional profile similar to that of an LC quad adapter, thereby allowing the MDC adapter to be used in place of LC quad adapters in fiber cassettes or other fiber enclosures. To achieve this, the rectangular MDC ports are oriented horizontally and arranged on the front face of the adapter in a 2×2 array. This port arrangement can also be expanded into a two-dimensional array of any number of N rows and M columns to yield adapters having more than four ports.

To the accomplishment of the foregoing and related ends, the disclosed subject matter, then, comprises one or more of the features hereinafter more fully described. The following description and the annexed drawings set forth in detail certain illustrative aspects of the subject matter. However, these aspects are indicative of but a few of the various ways in which the principles of the subject matter can be employed. Other aspects, advantages, and novel features of the disclosed subject matter will become apparent from the following detailed description when considered in conjunction with the drawings. It will also be appreciated that the detailed description may include additional or alternative embodiments beyond those described in this summary.

DETAILED DESCRIPTION

Figure 1:
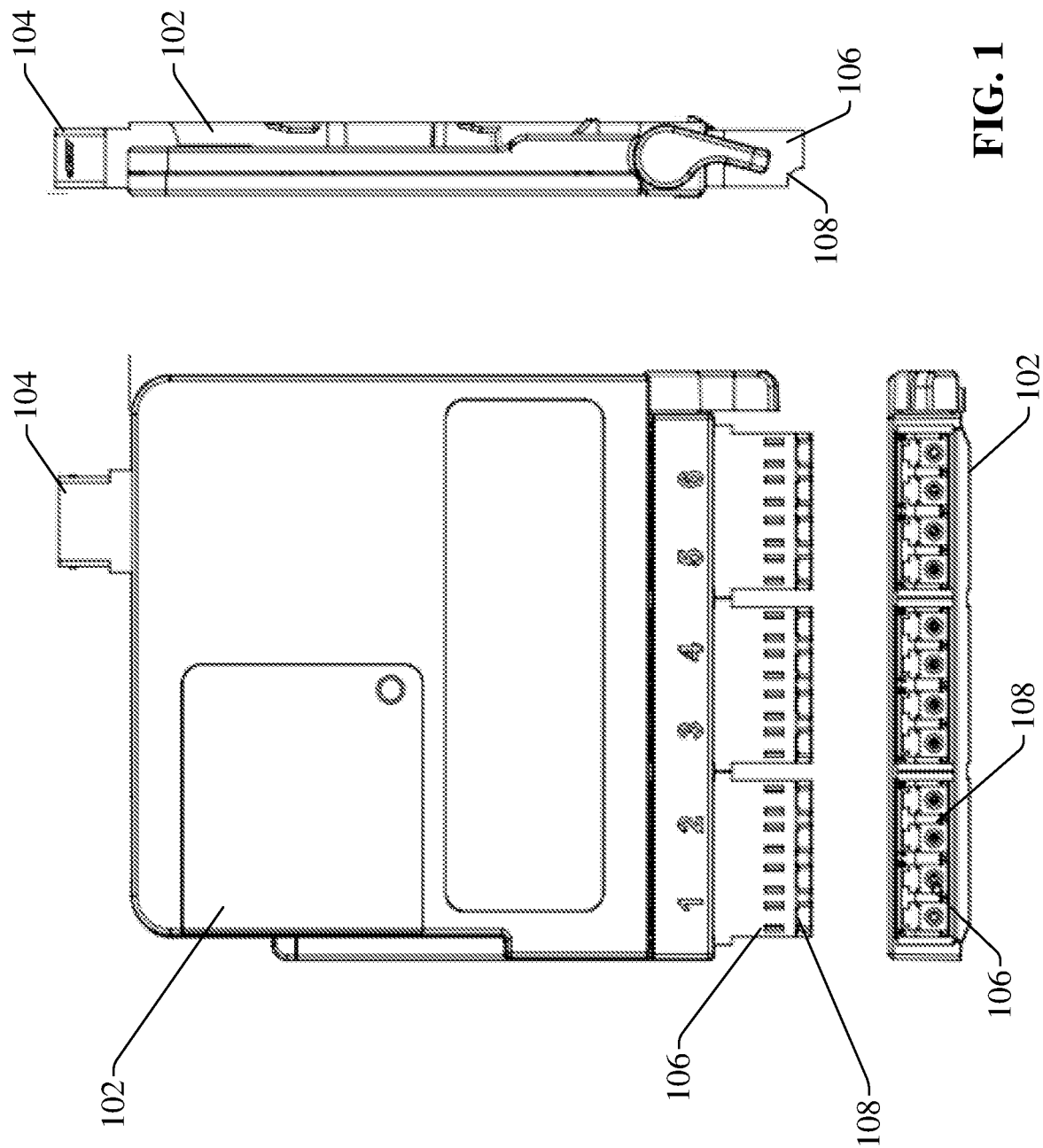
FIG. 1 is an orthographic view of an example fiber optic cassette.

The subject disclosure is now described with reference to the drawings wherein like reference numerals are used to refer to like elements throughout. In the following description, for purposes of explanation, numerous specific details are set forth in order to provide a thorough understanding of the subject disclosure. It may be evident, however, that the subject disclosure may be practiced without these specific details. In other instances, well-known structures and devices are shown in block diagram form in order to facilitate describing the subject disclosure.

Some reference numbers used herein to label illustrated components are suffixed with letters to delineate different instances of a same or similar component. In general, if a reference number without an appended letter is used within this disclosure, the descriptions ascribed to the reference number are to be understood to be applicable to all instances of that reference number with or without an appended letter unless described otherwise.

Fiber optic cables are often used as a medium for telecommunication and computer networking due to their flexibility, high data capacity, and immunity to interference. Since light is used as the data transmission medium, fiber optic cables can carry data over long distances with little attenuation relative to electrical data transmission. Fiber optic cables are used in many types of applications, including local area networks that use optical transceivers, corporate intranets that deploy optical pathways for high-speed transmission of data on a corporate campus, or other such data transmission applications.

Figure 2:
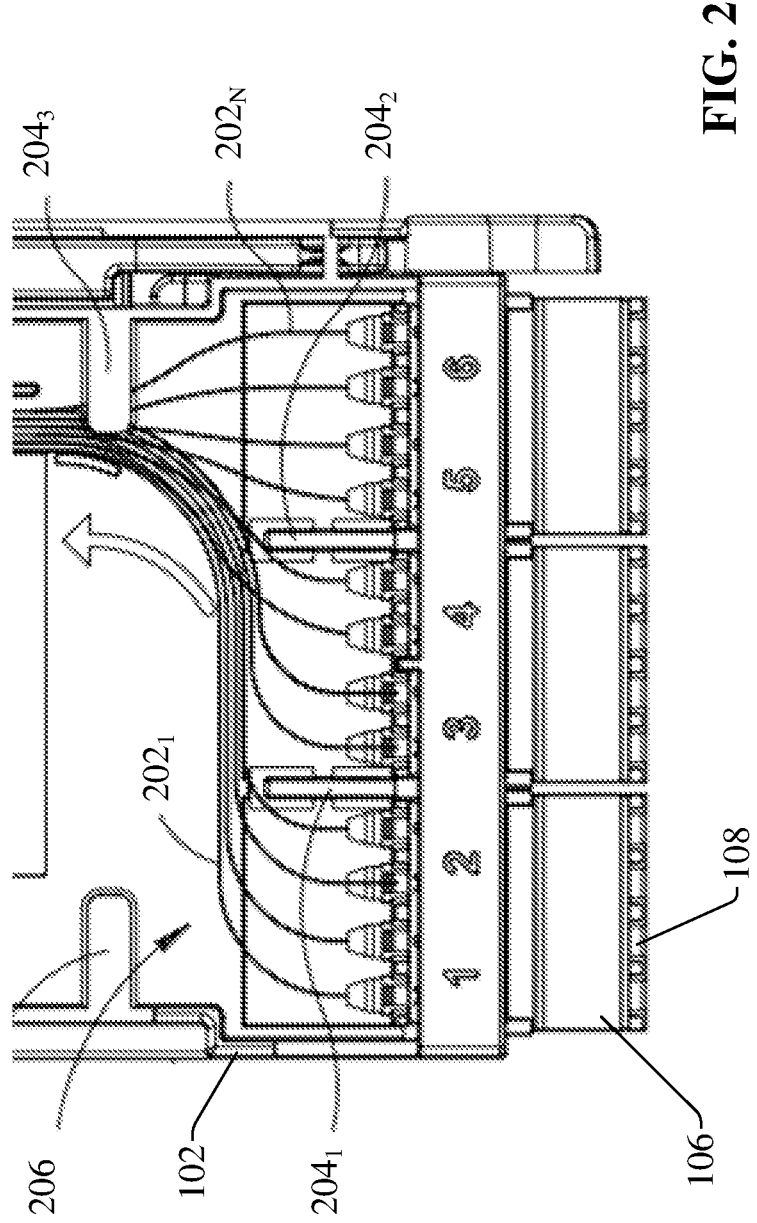
FIG. 2 is a top view of the front end of a cassette body with the body's cover removed, showing individual fibers of a fiber optic pigtail terminated on the rear sides of fiber optic adapters.

Fiber optic cassettes are often used to organize and manage fiber optic connections within enclosures. FIG. 1 is an orthographic view of an example fiber optic cassette comprising a cassette body 102, a rear adapter 104 installed on a rear side of the cassette body 102, and a row of front-facing adapters 106. A multifiber connector that terminates a fiber optic cable (not shown) can be plugged into a rear-facing receptacle of the rear adapter 104. Inside the cassette body 102, another multifiber connector that terminates a fiber optic pigtail (not shown) can be plugged into a front-facing receptacle of the rear adapter 104 within the cassette body 102, and individual fibers of the pigtail can be separated out and terminated on the rear sides of fiber optic adapters 106 mounted on the front of the cassette body 102. FIG. 2 is a top view of the front end of the cassette body 102 with the body's cover removed, showing individual fibers $202_1$-$202_N$ of the fiber optic pigtail 206 terminated on the rear sides of the fiber optic adapters 106. Fiber optic connectors terminating optical fibers (not shown) can be plugged into ports 108 on the front of the adapters 106. The adapters 106 provide connectivity between the individual fibers $202_1$-$202_N$ terminated on the rear sides of the adapters 106 and the fibers terminated by the connectors that are plugged into the ports 108 of the adapter 106.

The adapters 106 depicted in FIG. 1 are LC quad adapters that are each configured to receive two LC duplex fiber connectors. However, other types of adapters can accommodate other types of fiber optic connector, including but not limited to Lucent connectors (LC), Subscriber Connector (SC), multi-fiber connectors (MPO, MTP), miniature duplex connectors (MDC), or other types of fiber connectors.

Figure 3:
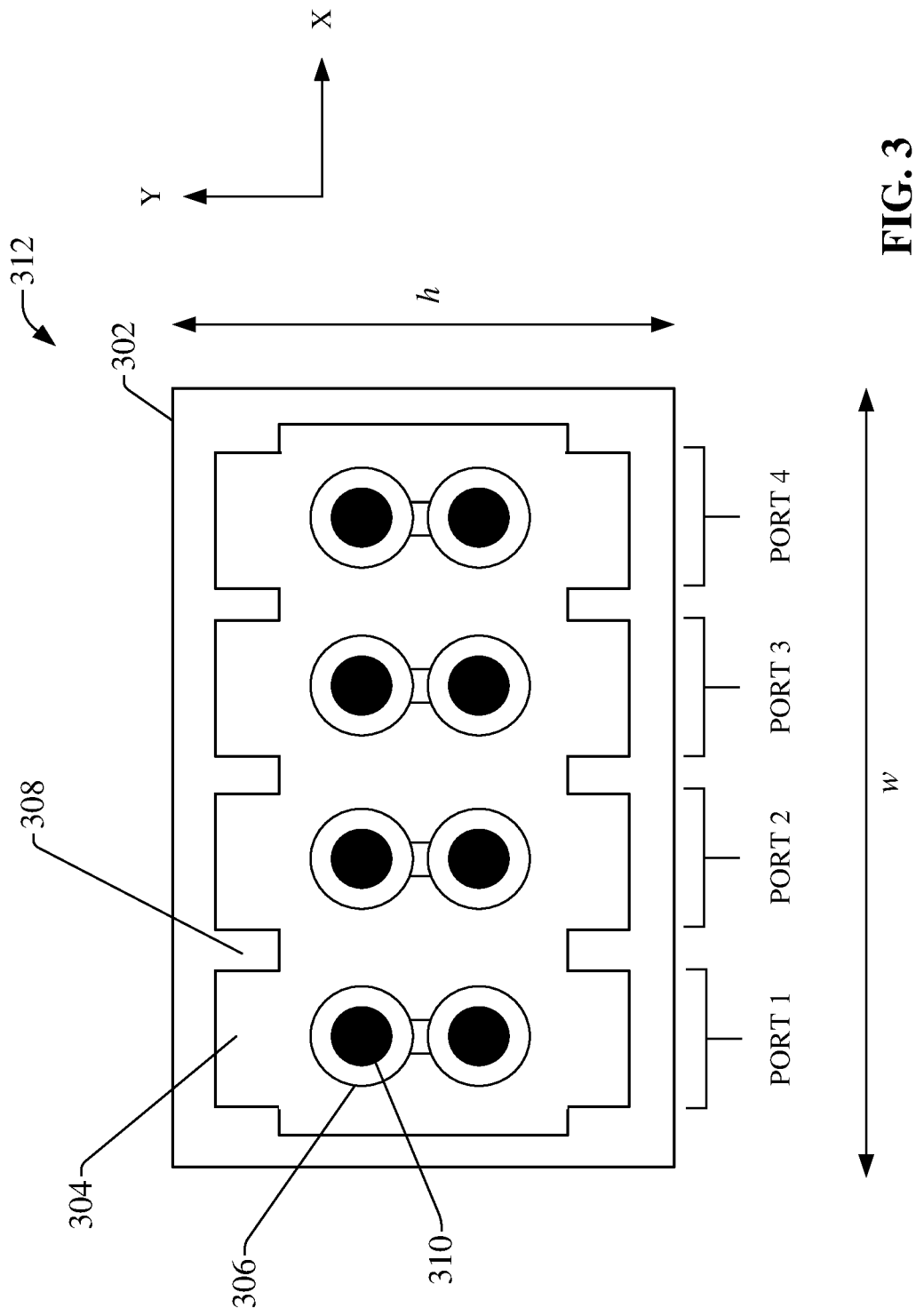
FIG. 3 is a front view of an example four-port MDC adapter.

FIG. 3 is a front view of an example four-port MDC adapter 312 configured to receive four MDC connectors. MDC adapter 312 comprises an adapter body 302 with four MDC ports 304 (labeled PORT 1 through PORT 4 in FIG. 3) formed on a front-facing side of the adapter 312. The MDC ports 304 are delineated, or separated, by dividing rails 308 formed on the top and bottom interior walls of the adapter body 302, which guide the MDC connectors as they are inserted into the ports 304 and maintain separation between the connectors. Each port 304 has a substantially rectangular footprint or profile corresponding to the dimensions of an MDC connector.

MDC connectors house two optical fibers, each of which is terminated on a respective ferrule that protrudes from the front of the connector, thereby providing termination and connectivity for a transmit fiber and a receive fiber. Accordingly, a pair of vertically stacked front-facing ferrule receptacles 306 are formed inside each adapter port 304. These ferrule receptacles 306 comprise hollow tubes whose channels 310 are open on both the front and rear sides of the receptacles 306. When an MDC connector is plugged into a port 304, the connector's two ferrules are received into the channels 310 of the receptacles 306, connecting the ferrules and their associated fibers to the fibers inside the cassette that are terminated on the rear-facing ends of the ferrule receptacles 306.

Each rectangular port 304 of the example MDC adapter 312 depicted in FIG. 3 is oriented vertically (that is, with the long sides of the ports 304 lie in the Y-axis direction), with the row of ports 304 arranged horizontally (in the X-axis direction). However, to accommodate this port arrangement, the outer dimensions of the adapter 312—that is, width w and height h—may yield an overall footprint for the adapter 312 that is different from other types of adapters, such as LC quad adapters. As such, the MDC adapter 312 depicted in FIG. 3 cannot be retrofitted into fiber cassettes or other fiber enclosures that are designed to accommodate LC quad adapters.

To address these and other issues, one or more embodiments described herein provide an MDC adapter that can accommodate at least four MDC ports while having a footprint or cross-sectional profile that is similar to that of an LC quad adapter, thereby allowing the MDC adapter to be used in fiber cassettes or other fiber enclosures that are designed to use LC quad adapters. Replacing an LC quad adapter with an MDC adapter can increase the channel density of the associated fiber enclosure, since an adapter with four MDC ports can support twice as many fibers as an LC quad adapter. To achieve this, the rectangular MDC ports are oriented horizontally and arranged in an 2×2 array. This arrangement can also be expanded to yield MDC adapters having more than four ports.

Figure 4:
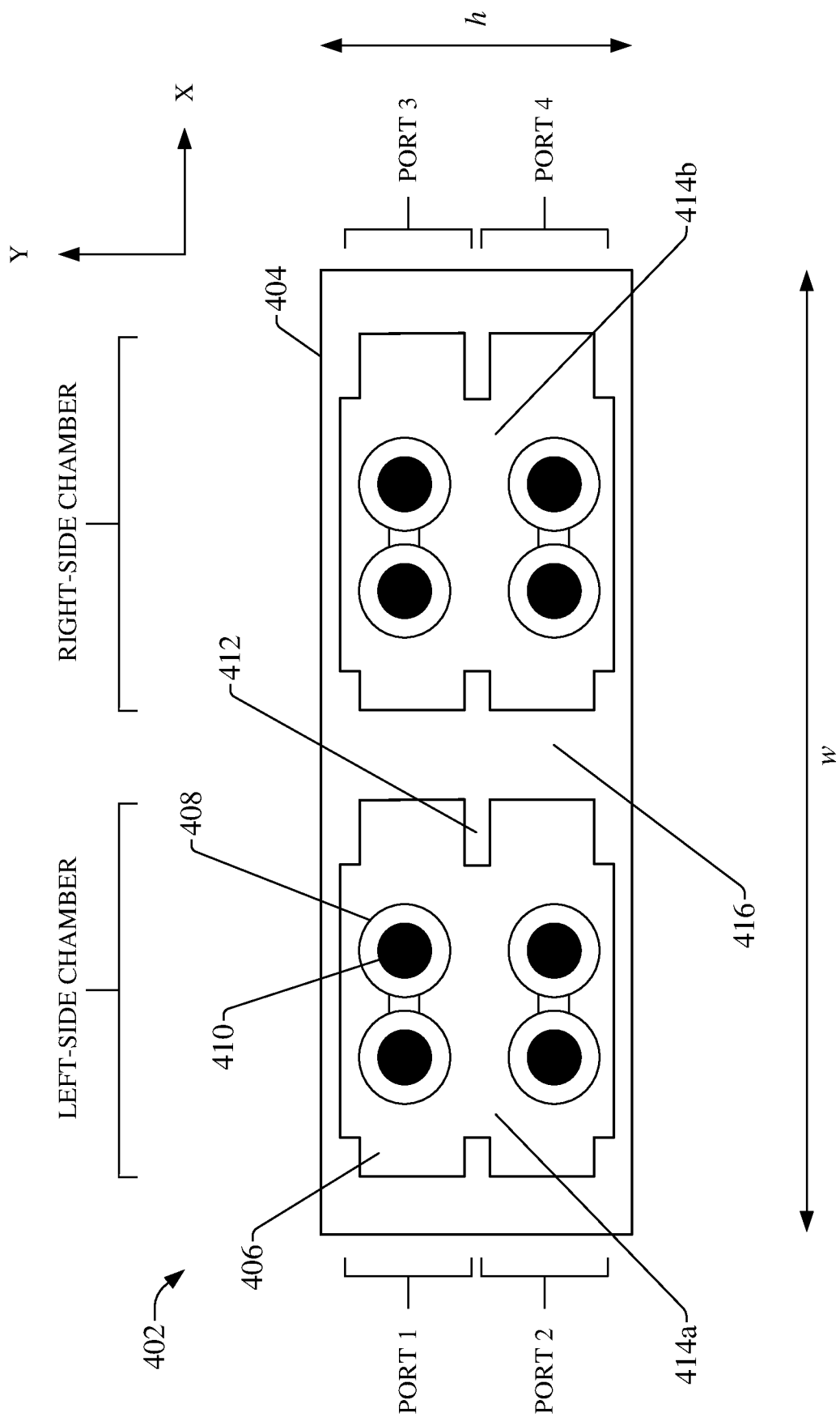
FIG. 4 is a front view of an example four-port MDC adapter comprising an adapter body in which are formed four MDC ports that are oriented horizontally rather than vertically.
Figure 5:
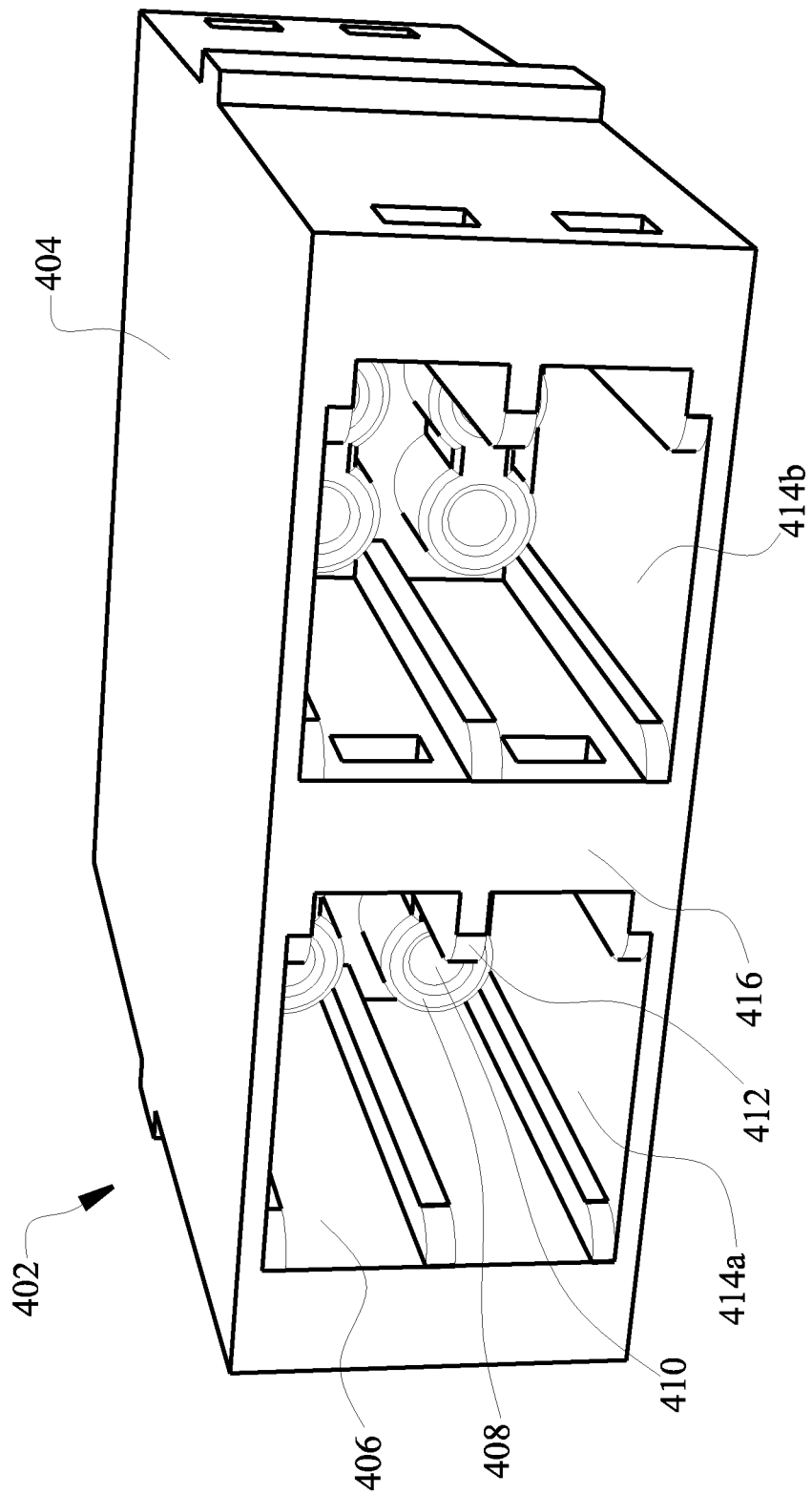
FIG. 5 is a perspective view of the four-port MDC adapter of FIG. 4.
Figure 6A:
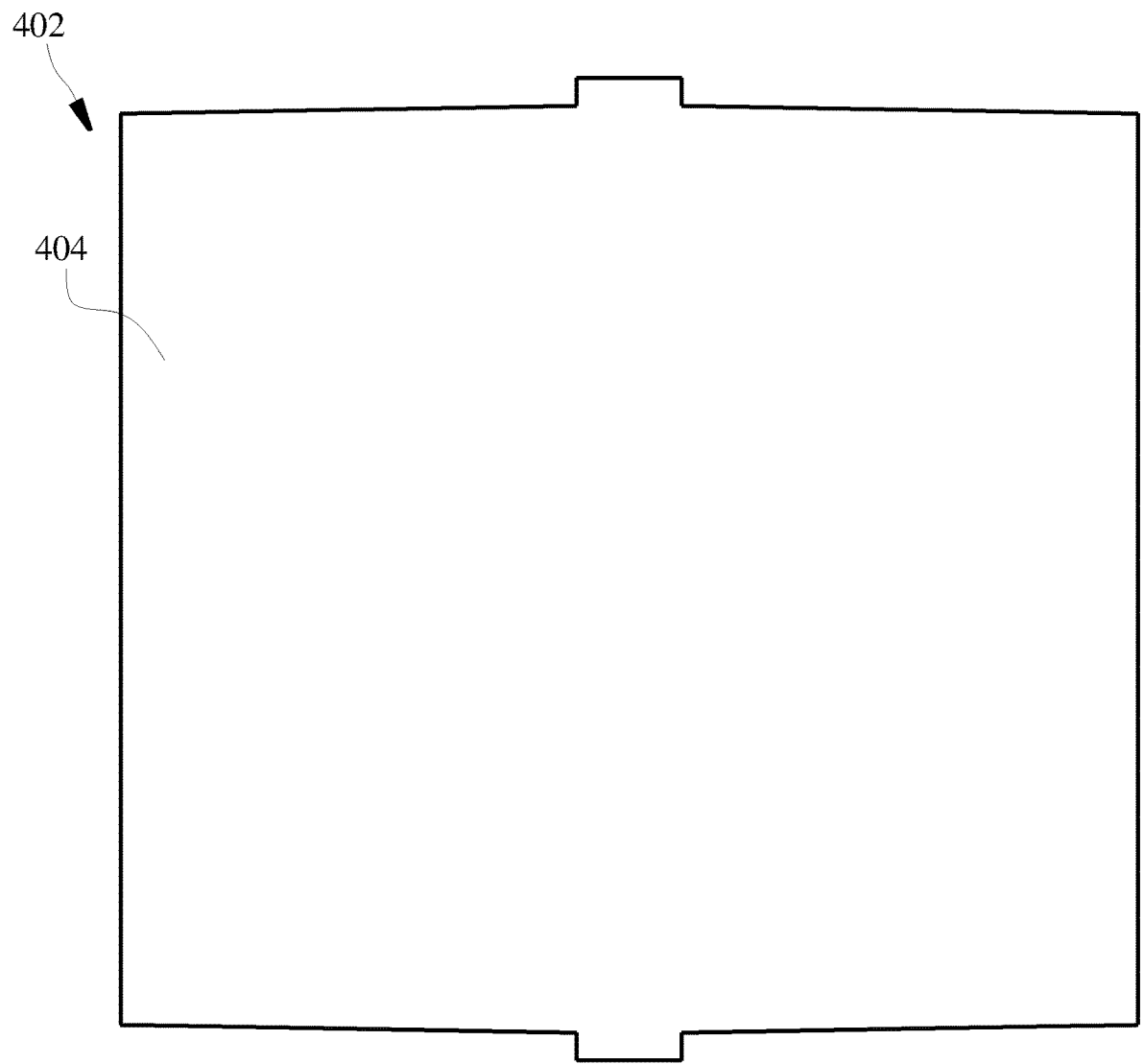
FIG. 6a is a top view of the four-port MDC adapter of FIG. 4.
Figure 6B:
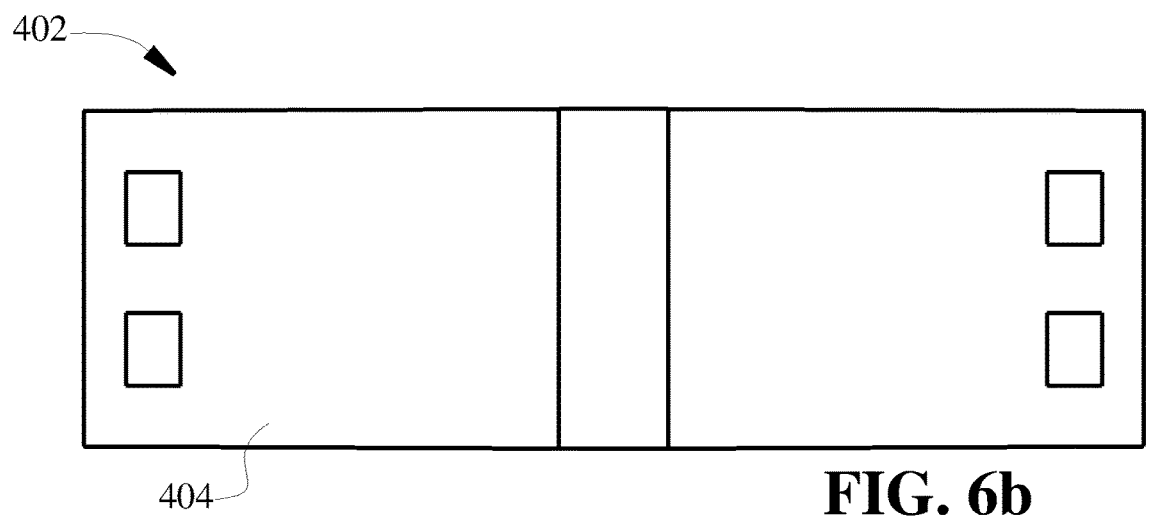
FIG. 6b is a side view of the four-port MDC adapter of FIG. 4.

FIG. 4 is a front view of an example four-port MDC adapter 402 comprising an adapter body 404 in which are formed four MDC ports 406 that are oriented horizontally rather than vertically. FIG. 5 is a perspective view of the MDC adapter 402. FIGS. 6a and 6b are top and side views, respectively, of the MDC adapter 402. The dimensions of each port 406 of MDC adapter 402 are similar to those of ports 304 of adapter 312. However, in contrast to the vertical orientation of ports 304, ports 406 are oriented horizontally such that the long sides of each port 406 lie in the X-axis direction. The pair of ferrule receptacles 408 inside each port 406 are similarly oriented horizontally such that the receptacles 408 of each pair are oriented as a left and right pair rather than being vertically stacked, as in adapter 312. As with ferrule receptacles 306, the channels 410 of ferrule receptacles 408 can be open on both the front and rear sides of the receptacles 410 to allow connectivity between the ferrules of an inserted MDC connector and the fibers that are terminated on the rear-facing ends of the ferrule receptacles 408.

Figure 7:
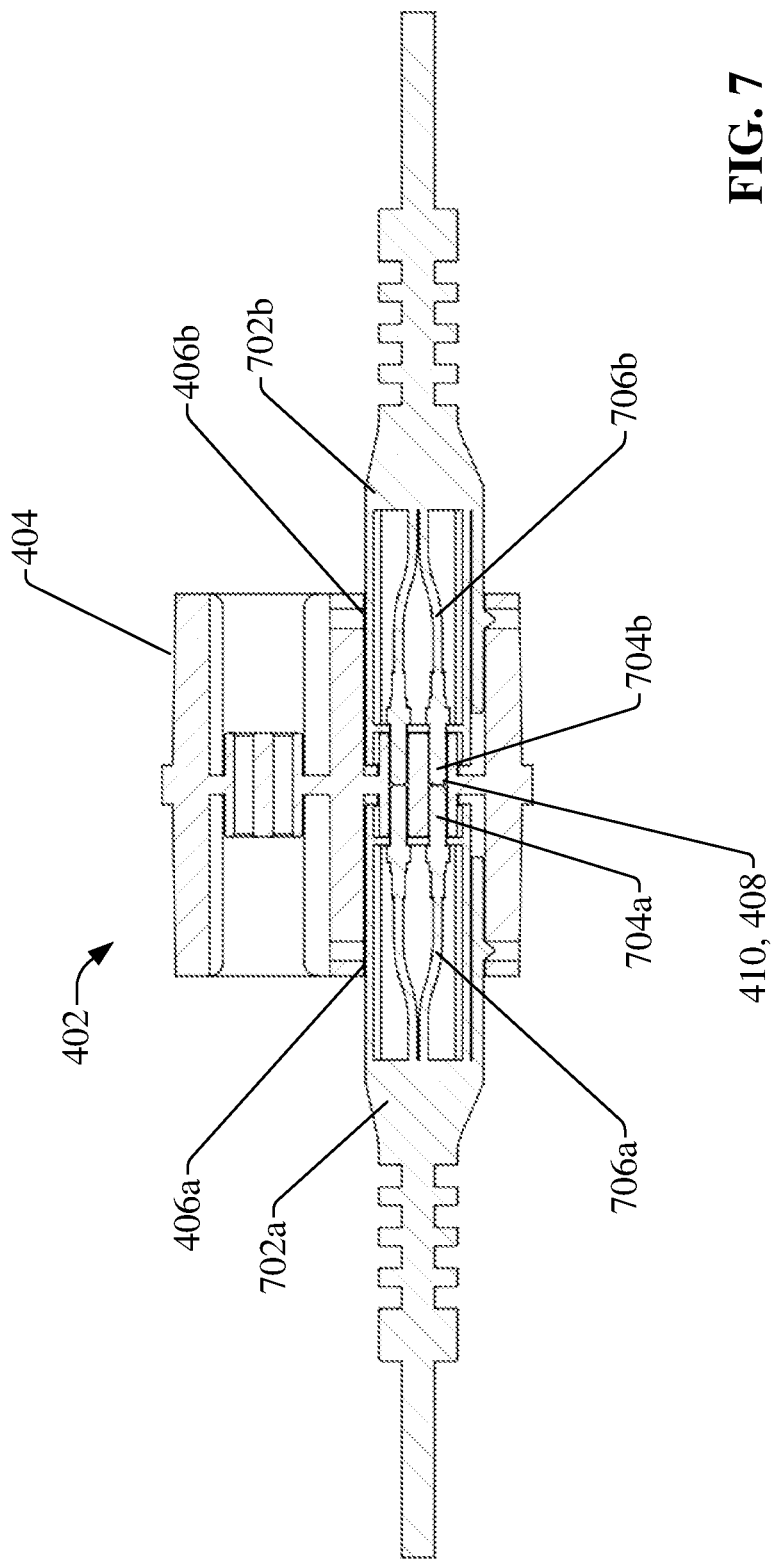
FIG. 7 is a top view of the four-port MDC adapter with a first MDC connector and a second MDC connector plugged into corresponding front-side and rear-side ports.

FIG. 7 is a top view of the MDC adapter 402 with a first MDC connector 702a and a second MDC connector 702b plugged into corresponding front-side and rear-side ports 406a and 406b, respectively, with the adapter 402 made transparent to depict the internal connectivity between the two connectors 702a and 702b. The tops of the connectors 702a and 702b have also been removed to visualize the internal connectivity between the two connectors 702a and 702b while plugged into the adapter 702. As can be seen in this view, while the connectors 702a and 702b are plugged into opposing ports 406a and 406b of the adapter 402, the ferrules 704a, 704b that terminate opposing optical fibers 706a, 706b of the two connectors 702a, 702b are inserted into the channel 410 of one of the ferrule receptacles 408 that connect the front-facing port 406a and the rear-facing port 406b, and make contact within the channel 410.

Returning to FIG. 4, in contrast to the strictly horizontal port arrangement of adapter 312, ports 406 of adapter 402 are arranged in a 2×2 array formation. That is, two of the four ports 406—PORT 1 and PORT 2 in FIG. 3—are arranged vertically with respect to one another on a left-hand side of the adapter's front face, while the other two ports—PORT 3 and PORT 4 in FIG. 4—are arranged vertically with respect to one another on the right-hand side of the adapter's front face.

In the example embodiment depicted in FIGS. 4-7, each pair of vertically stacked ports 406 is formed within a separate chamber 414. That is, a left-side chamber 414a and a right-side chamber 414b are formed in the front of the adapter body 404, with the left ports 406 (PORT 1 and PORT 2) being formed within the left-side chamber 414a, and the right ports 406 (PORT 3 and PORT 4) being formed within the right-side chamber 414b. The two vertically stacked ports 406 of each chamber 414 are delineated, or separated, by rails 412 formed on the left and right walls of the chamber 414. These rails 412 assist in guiding an MDC connector into place as the connector is being inserted into a port 406, and also maintain separation between upper and lower connectors plugged into the upper and lower ports 406, respectively. Although FIGS. 4 and 5 depict the vertically stacked ports 406 being separated by rails 412 that extend only partially into their corresponding chambers 414, in some embodiments the vertically stacked ports 406 may be separated by horizontal walls that extend across the width of the chambers 414. The chambers 414a and 414b themselves are separated by a wall 416.

This port arrangement allows four MDC ports 406 to be formed within an adapter 402 having outer dimensions (height h and width w) that are equal or similar to those of an LC quad adapter, allowing the adapter 402 to be used in place of an LC quad adapter within cassettes, enclosures, panels, or other fiber structures that are designed to use LC quad adapters. The four-port MDC adapter 402 depicted in FIGS. 4-7 doubles the channel density relative to an LC quad adapter, and consequently retrofitting adapter 402 within a cassette or other enclosure that supports LC quad adapters increases the data capacity of those enclosures.

Figure 8:
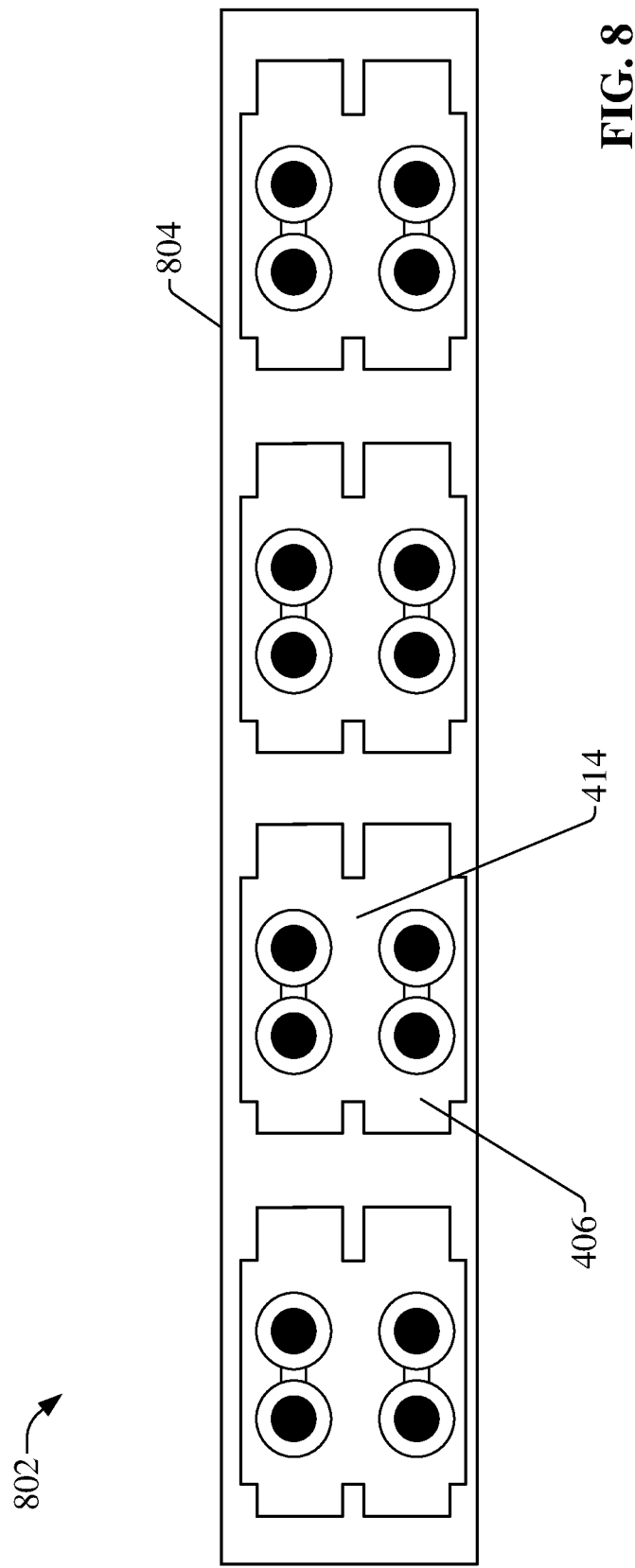
FIG. 8 is a front view of an example eight-port MDC adapter in which eight horizontally oriented ports are arranged in a 4×2 arrangement on the front face of the adapter body.

The 2×2 port array of adapter 402 can also be expanded to accommodate larger numbers of MDC ports 406. For example, FIG. 8 is a front view of an example eight-port MDC adapter 802 in which eight horizontally oriented ports 406 are arranged in a 4×2 arrangement on the front face of the adapter body 804. This design adds two additional chambers 414 relative to the four-port adapter 402 of FIG. 4, with the chambers 414 arranged horizontally. In addition or alternatively, the number of ports can be increased by increasing the number of vertically stacked ports in the port array (that is, by forming chambers 414 having more than two vertically stacked ports). For example, another eight-port version of adapter 402 may maintain the two chambers 414a and 414b but increase the number of vertically stacked ports in each chamber 414 from two to four. Adding a third horizontally arranged chamber 414, each with four vertically stacked ports 406, yields a 12-port version of the MDC adapter 402. In general, the port arrangement of adapter 402 can conform to any N×M array to yield any number of ports 406, where N is an integer representing a number of rows and M is an integer representing a number of columns.

Also, although the example adapter 402 described above comprises ports configured to accommodate MDC connectors, the general port arrangement depicted in FIGS. 4-7, in which the ports are oriented horizontally and arranged in an N×M array, can be used in adapters that support other types of fiber ports with rectangular footprints, including but not limited to SN, Corning/Senko (CS), MMC, and Unified Optical Fiber (UCD) ports.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

What has been described above includes examples of systems and methods illustrative of the disclosed subject matter. It is, of course, not possible to describe every combination of components or methodologies here. One of ordinary skill in the art may recognize that many further combinations and permutations of the claimed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A fiber optic adapter, comprising:
   an adapter body; and
   at least four miniature duplex connector (MDC) ports, formed on a front face of the adapter body, having rectangular footprints and configured to receive respective fiber optic connectors,
   wherein
   the at least four MDC ports comprise at least a first pair of vertically stacked ports and a second pair of vertically stacked ports,
   the first pair and the second pair are arranged horizontally,
   the first pair of vertically stacked ports are defined within a first chamber formed through a front face of the adapter body and are separated by a first pair of rails formed on side walls of the first chamber, and
   the second pair of vertically stacked ports are defined within a second chamber formed through the front face of the adapter body and are separated by a second pair of rails formed on side walls of the second chamber.

2. The fiber optic adapter of claim 1, wherein the fiber optic adapter is configured to be installed in at least one of a fiber optic cassette, a fiber optic enclosure, or a fiber optic panel.

3. The fiber optic adapter of claim 1, wherein first outer dimensions of the fiber optic adapter are equal or substantially equal to second outer dimensions of a Lucent Connector (LC) quad adapter.

4. The fiber optic adapter of claim 1, wherein a port of the at least four MDC ports comprises a pair of ferrule receptacles that are arranged horizontally.

5. A fiber optic adapter, comprising:
   an adapter body in which four or more miniature duplex connector (MDC) fiber optic ports are formed,
   wherein
   the four or more MDC fiber optic ports are configured to receive fiber optic connectors having rectangular profiles,
   the four or more MDC fiber optic ports comprise;
     at least two first fiber optic ports that are defined within a first chamber formed through a front face of the adapter body, wherein the at least two first two fiber optic ports are oriented horizontally and arranged vertically, and
     at least two second fiber optic ports that are defined within a second chamber formed through the front face of the adapter body, wherein the at least two second two fiber optic ports are oriented horizontally and arranged vertically, the at least two first fiber optic ports and the at least two second fiber optic ports are arranged horizontally, the at least two first fiber optic ports are delineated from one another by a first pair of rails formed on side walls of the first chamber, and the at least two second fiber optic ports are delineated from one another by a second pair of rails formed on side walls of the second chamber.

6. The fiber optic adapter of claim 5, wherein the four or more MDC fiber optic adapters are arranged in an N×M array, where N is an integer representing a number of rows and M is an integer representing a number of columns.

7. The fiber optic adapter of claim 5, wherein the fiber optic adapter is configured to be installed in at least one of a fiber optic cassette, a fiber optic enclosure, or a fiber optic panel.

8. The fiber optic adapter of claim 5, wherein a first cross-sectional profile of the fiber optic adapter is equal to or substantially equal to a second cross-sectional profile of a Lucent Connector (LC) quad adapter.

9. The fiber optic adapter of claim 5, wherein a port of the four or more MDC fiber optic ports comprises a pair of ferrule receptacles that are arranged horizontally.

10. A fiber optic adapter, comprising:
an adapter body;
a first set of vertically stacked miniature duplex connector (MDC) fiber optic ports defined within a first chamber formed on a front face of the adapter body; and
a second set of vertically stacked MDC fiber optic ports defined within a second chamber formed on the front face of the adapter body,
wherein
respective ports of the first set and the second set have rectangular profiles and are oriented horizontally,
the first set of vertically stacked MDC fiber optic ports are separated from one another by a first pair of rails formed on side walls of the first chamber,
the second set of vertically stacked MDC fiber optic ports are separated from one another by a second pair of rails formed on side walls of the second chamber, and
the first set and the second set are arranged horizontally.

11. The fiber optic adapter of claim 10, wherein the first set and the second set respectively comprise two or more fiber optic ports.

12. The fiber optic adapter of claim 10, wherein the fiber optic adapter is configured to be installed in at least one of a fiber optic cassette, a fiber optic enclosure, or a fiber optic panel.

13. The fiber optic adapter of claim 10, wherein a first cross-sectional profile of the adapter body is substantially equal to a second cross-sectional profile of a Lucent Connector (LC) quad adapter.

14. The fiber optic adapter of claim 1, wherein the four or more MDC fiber optic ports are arranged in an N×M array, where N and M are equal or non-equal integers greater than one.

15. The fiber optic adapter of claim 1, wherein the fiber optic adapter is configured to be installed in a fiber cassette, enclosure, or panel that is configured to accept a Lucent Connector (LC) quad adapter.

16. The fiber optic adapter of claim 15, wherein the fiber optic adapter doubles a channel density relative to the LC quad adapter.

17. The fiber optic adapter of claim 5, wherein the fiber optic adapter is configured to be installed in a fiber cassette, enclosure, or panel that is configured to accept a Lucent Connector (LC) quad adapter.

18. The fiber optic adapter of claim 17, wherein the fiber optic adapter doubles a channel density relative to the LC quad adapter.

19. The fiber optic adapter of claim 10, wherein the fiber optic adapter is configured to be installed in a fiber cassette, enclosure, or panel that is configured to accept a Lucent Connector (LC) quad adapter.

20. The fiber optic adapter of claim 19, wherein the fiber optic adapter doubles a channel density relative to the LC quad adapter.

* * * * *